Nov. 19, 1929.　　　T. C. WILLIAMS　　　1,736,238
FOOD CUTTER
Filed April 18, 1928
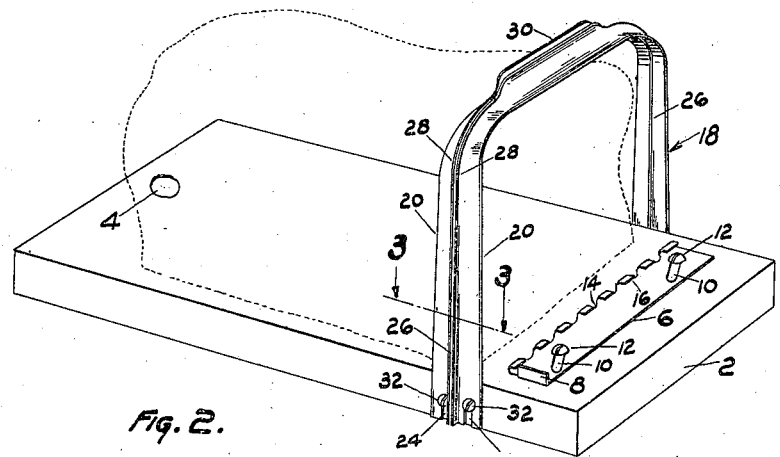
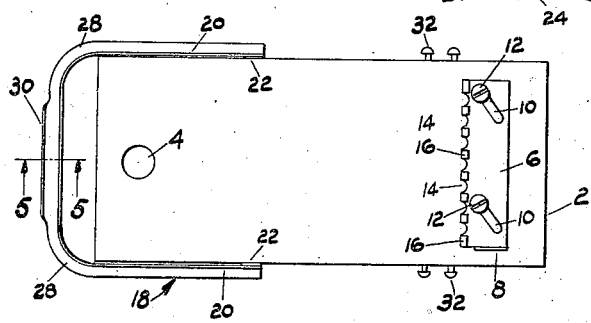
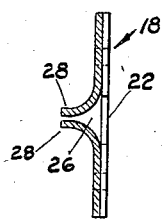
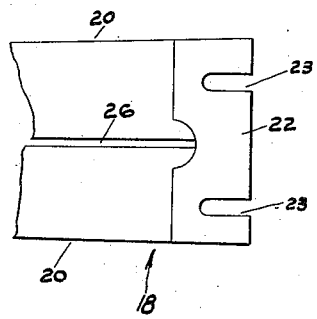
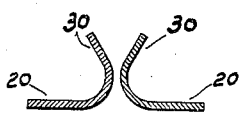
INVENTOR.
T. C. WILLIAMS
BY
ATTORNEY Patented Nov. 19, 1929

1,736,238

UNITED STATES PATENT OFFICE

THOMAS C. WILLIAMS, OF BAKERSFIELD, CALIFORNIA

FOOD CUTTER

Application filed April 18, 1928. Serial No. 271,032.

My invention relates to food cutting devices for cutting food, such as bread, meats, sausage, or the like, so that said food may be cut of even thickness, said devices serving to take the place of the expensive motor and hand-operated devices now on the market, said invention comprising an improvement on my co-pending application for a food cutter, Serial Number 182,606, filed April 11, 1927.

An object of my invention is to provide a novel form of food cutter in which a perfectly plain base is provided with a detachable U-shaped slotted member, having a knife engaging slot and outwardly flared knife inserting portions, said base being also provided with a translatory movable stop plate for regulating the depth of cut of the food, said U-shaped member, when detached, being adapted to be slipped over either end of said base to facilitate packing of the devices when they are shipped.

It is also within the province of my invention to provide the stop plate with cut-away portions defining bent over flanges and slots for receiving the crumbs or small portions of the food cut so as not to interfere with the cutting, said plate being also provided with inclined slots for receiving guiding devices so that said plate may be moved diagonally to adjust the depth of cut of the food.

The above and further objects and advantages of my invention, as will hereinafter more fully appear, I attain by the structure described in the specification, and illustrated on the drawings, forming a part of my application.

Reference is had to the accompanying drawings, in which similar reference characters denote similar parts. In the drawings, Fig. 1 is a perspective view of my invention, showing in dotted lines the manner in which the food is cut, Fig. 2 is a top plan view of Fig. 1, but showing the U-shaped member in one position for facilitating packing of the devices for shipment, Fig. 3 is an enlarged cross-sectional view, taken on the line 3—3, Fig. 1, looking in the direction of the arrows, Fig. 4 is an enlarged fragmentary view of one of the lower ends of the U-shaped member, and Fig. 5 is an enlarged cross-sectional view taken on the line 5—5, Fig. 2, looking in the direction of the arrows.

Describing my invention more in detail, a base 2, of suitable material, such as wood, is preferably provided with a hole or other means 4 whereby the device may be suspended when not in use, and on said base an adjustable plate 6, perferably of metal, is positioned, said plate, in the manner presently to be explained, functioning as a stop whereby the depth of cut of the food may be accurately regulated anywhere from a thick down to a very thin cut of the food.

The plate 6 may be provided at one end with an upturned flange 8, serving, if desired, as a means for manually moving said plate, a set of preferably angular slots 10 being cut in said plate, in which slots are positioned suitable guides 12, and which may take the form of ordinary screws, said guides and slots functioning to permit the plate to move in a translatory or diagonal manner across the base 2, for varying the depth of cut of the food as hereinbefore referred to.

As seen in Figs. 1 and 2, the plate 6 is cut-away to provide a set of slots or cavities 14, defining bent over portions 16, which cavities are adapted to receive the crumbs or bits of food resulting from the cutting so that an accurate cut will be insured.

Juxtaposed to the plate or stop 6 is the U-shaped member designated generally by the reference numeral 18, which member is preferably made up of two complementary pieces 20, preferably secured together by a suitable means such as the slotted plate 22 (see Fig. 4), provided with slots 23, which slots are in alignment with the slots 24 of the pieces 20.

The pieces 20 are U-shaped and are so positioned as to define a slot 26 therebetween, said pieces being provided with the outwardly extending flanges 28, said flanges terminating in outwardly flared portions 30 (Figs. 1 and 2) to facilitate the introduction of a knife, said flanges and slot functioning to serve as a guiding means for the knife.

The U-shaped member 20 is preferably detachably associated with the base 2, the slots 23 and 24 taking into suitable fastening means 32 which may be in the shape of ordinary screws, said U-shaped member closely fitting the base 2 as it is slipped thereover, the slots 23 and 24 fitting over the screws 32.

Adjusting the plate 6, as hereinbefore described, the proper cut of food desired may be had, and the knife inserted between the flared portions 30, after which the food may be cut as desired, the slot 26 and flanges 28 insuring an even cut, the bits of food accumulating in the cut-away portions 14. When these portions are filled, it is a matter of but a moment to unscrew the screws 12, and the plate 6 cleaned and replaced.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claim.

I claim as my invention:

A stop plate adapted for special use in connection with a food cutter, said plate being provided with cut-away portions defining a set of bent-over flanges and crumb receiving slots, and a set of diagonally positioned stops for receiving guiding means for guiding the movement of said plate, whereby said plate may be diagonally adjusted.

In testimony whereof I have signed my name to this specification.

THOMAS C. WILLIAMS.